US005889090A

United States Patent [19]
Tooley et al.

[11] Patent Number: 5,889,090
[45] Date of Patent: *Mar. 30, 1999

[54] PROCESSIBILITY AND LACING RESISTANCE WHEN SILANIZED PIGMENTS ARE INCORPORATED IN POLYMERS

[75] Inventors: Patricia Ann Tooley, Wilmington; Dwight Alan Holtzen, Newark; Joseph Anthony Musiano, New Castle, all of Del.

[73] Assignee: E. I. duPont deNemours & Company, Wilmington, Del.

[*] Notice: The term of this patent shall not extend beyond the expiration date of Pat. No. 5,631,310.

[21] Appl. No.: 856,889

[22] Filed: May 15, 1997

Related U.S. Application Data

[60] Continuation of Ser. No. 477,754, Jun. 7, 1995, Pat. No. 5,631,310, which is a division of Ser. No. 203,108, Feb. 28, 1994, Pat. No. 5,607,994.

[51] Int. Cl.⁶ .......................................... L08K 9/06
[52] U.S. Cl. .......................... 523/212; 524/265; 524/267; 524/269
[58] Field of Search ............................ 523/212; 524/265, 524/267, 269

[56] References Cited

U.S. PATENT DOCUMENTS

| | | | |
|---|---|---|---|
| Re. 30,450 | 12/1980 | Iannicelli | 106/308 N |
| 3,179,612 | 4/1965 | Plueddemann | 260/29.2 |
| 3,227,675 | 1/1966 | Papalos | 260/41 |
| 3,249,464 | 5/1966 | Nelson et al. | 117/76 |
| 3,317,369 | 5/1967 | Clark et al. | 161/193 |
| 3,328,450 | 6/1967 | Plueddemann | 260/448.8 |
| 3,395,069 | 7/1968 | Plueddemann | 161/193 |
| 3,649,321 | 3/1972 | Durrant et al. | 523/212 |
| 3,834,924 | 9/1974 | Grillo | 106/308 N |
| 3,849,152 | 11/1974 | Mimeault | 106/308 |
| 3,915,735 | 10/1975 | Moreland | 106/308 Q |
| 4,061,503 | 12/1977 | Berger et al. | 106/300 |
| 4,136,080 | 1/1979 | Berger | 260/40 R |
| 4,141,751 | 2/1979 | Moreland | 106/308 |
| 4,151,154 | 4/1979 | Berger | 260/40 |
| 4,175,977 | 11/1979 | Heaton et al. | 106/272 |
| 4,209,430 | 6/1980 | Weber | 260/23 H |
| 4,210,573 | 7/1980 | Cornell | 260/42.15 |
| 4,318,843 | 3/1982 | Kohler | 523/212 |
| 4,650,747 | 3/1987 | Uno et al. | 430/536 |
| 4,689,085 | 8/1987 | Plueddemann | 106/287.14 |
| 4,721,747 | 1/1988 | Doshi | 524/261 |
| 4,798,856 | 1/1989 | Ayala et al. | 524/386 |
| 4,810,305 | 3/1989 | Braun et al. | 106/499 |
| 4,820,761 | 4/1989 | Saito et al. | 524/456 |
| 4,877,819 | 10/1989 | Kiyohara et al. | 523/200 |
| 4,882,225 | 11/1989 | Fukui et al. | 428/405 |
| 4,891,399 | 1/1990 | Ohkawa et al. | 523/200 |
| 5,049,595 | 9/1991 | Dethlefs et al. | 523/351 |
| 5,087,655 | 2/1992 | Okamoto et al. | 524/432 |
| 5,180,658 | 1/1993 | Kiyohara et al. | 430/533 |
| 5,252,633 | 10/1993 | Ohara et al. | 523/210 |
| 5,288,320 | 2/1994 | Decelles | 106/445 |
| 5,338,777 | 8/1994 | Tarquini | 523/212 |
| 5,411,761 | 5/1995 | Inokuchi et al. | 427/220 |
| 5,455,080 | 10/1995 | van Ooij | 427/470 |
| 5,458,680 | 10/1995 | Shurling, Jr. et al. | 106/487 |
| 5,534,584 | 7/1996 | Kitamura et al. | 524/497 |
| 5,653,794 | 8/1997 | Weber et al. | 106/442 |

FOREIGN PATENT DOCUMENTS

| | | | |
|---|---|---|---|
| 88180-A | 11/1991 | Australia . | |
| 88180 | 6/1992 | Australia . | |
| 0 523 654 A1 | 1/1903 | European Pat. Off. . | |
| 0389 266 A1 | 9/1990 | European Pat. Off. | C08L 67/02 |
| 0 558 032 A2 | 9/1993 | European Pat. Off. . | |
| 57036156 A | 2/1982 | Japan | C08K 9/02 |
| 58007630 A | 1/1983 | Japan | D21H 1/34 |
| 61250034 A | 11/1986 | Japan | C08J 3/22 |
| 63221187 A | 9/1988 | Japan | C09K 3/32 |
| 01130514 A | 5/1989 | Japan | C08K 9/06 |
| 5-139748 | 6/1991 | Japan . | |
| 57-163604 | 6/1991 | Japan . | |
| 07053910 A | 2/1995 | Japan | C09D 127/12 |
| 07149926 A | 6/1995 | Japan | C08J 5/18 |
| 07166131 A | 6/1995 | Japan | C09D 183/04 |
| 594802 | 11/1947 | United Kingdom . | |
| 785393 | 10/1957 | United Kingdom . | |
| 825404 | 12/1959 | United Kingdom . | |
| 1 248 256 | 10/1968 | United Kingdom . | |
| 1154835 | 6/1969 | United Kingdom . | |
| 1204323 | 9/1970 | United Kingdom . | |

OTHER PUBLICATIONS

Witucki, Gerald L., A Silane Primer: Chemistry and Applications of Alkoxy Silanes, *Journal of Coatings Technology*, 65, No. 822, 57–60, Jul. 1993.

Union Carbide Corporation, *Filler Treatment*, 1968.

Castor, W.S., et al., Optical and Other Effects of White Pigments in Plastics, *Additives For Plastics*, vol. 1, 233–244, 1978.

Pawlenko, S., et al., Organosilicon Compounds, 1980.

Union Carbide Corporation, *Organofunctional Silanes*, 1991.

"The Pigment Handbook", vol. 1, 2$^{nd}$ Edition, John Wiley & Sons, NY, 1988.

Plueddeman, et al, The Society of the Plastics Industry, Inc., "Evaluation of New Silane Coupling Agents for Glass Fiber Reinforced Plastics", Section 14—The Glass Resin Interface Seminar, p. 11, Chicago, Feb. 6–8, 1962.

Chemical Abstracts, vol. 112, 57383n, 1990.

Modern Plastics—Special Buyers' Guide & Encyclopedia Issue for 1993.

Debal Gupta, Prediction of Dispersion of Pigments in Thermoplastic Resins with the Help of an Extruder, *Soc. Plast. Eng., Tech. Paper* 25, pp. 311–318 (1979).

(List continued on next page.)

*Primary Examiner*—Peter D. Mulcahy

[57] ABSTRACT

White-pigmented polymers (particularly, polyolefins such as polyethylene) containing white pigments treated with at least one silane or a mixture of at least one silane and at least one polysiloxane are disclosed to improve processibility in compounding and improve performance properties such as lacing resistance in a polymeric matrix.

23 Claims, No Drawings

OTHER PUBLICATIONS

David Williams, The Effect of Siloxane–additioned Titanium Dioxide Pigments on the Heat Sealing and Printing Properties of Low Density Polyethylene Film, *Soc. Plast. Eng. Tech. Paper,* 25, pp. 307–310 (1979).

White Concentrates, *Modern Plastics,* vol. 68, No. 2, p. 90 (Feb. 1991).

Stable TiO2 Pigment, *Modern Plastics,* vol. 68, No. 4, p. 96 (Apr. 1991).

The Biggest Antec Ever Covers All the Bases, *Modern Plastics,* vol. 68, No. 6, pp. 54, 231 (Jun. 1991).

Modified Heavy Metals Prosper, Despite Reformulation Trend, *Modern Plastics,* vol. 69, No. 9, p. 46 (Sep. 1991).

Heavy–Metal Restrictions Promote Organic Replacements, *Modern Plastics,* vol. 69, No. 9, p. 58 (Sep. 1992).

Handbook of Fillers for Plastics, edited by Harry S. Katz and John V. Milewski, Van Nostrand Reinhold, excerpted portions (1987).

TiO2 in Plastics: A Balancing Act, *Plastics Compounding,* p. 44 (Nov./Dec. 1992).

Dialog Alert DA001, *Dialog File 319: Chem Bus. Newsbase* (Aug. 1991).

Ampacet in Concentrates, *CMR* (Oct. 1991).

H. P. Schreiber, Pigment Dispersion in Thermally Modified Polyethylenes, *Journal of Applied Polymer Science,* vol. 39, pp. 465–470 (1990).

J. Winkler, Influence of Surface Treatment on the Strength of TiO2 Agglomerates, *Farbe & Lack* 94, No. 4, p. 263 (1988).

Meyer R. Rosen, Technological Review, From Treating Solution to Filler Surface and Beyond—The Life History of a Silane Coupling Agent, *Journal of Coatings Technology,* vol. 50. No. 644, pp. 70–82 (Sep. 1978).

Edwin P. Plueddemann, Silane Coupling Agents, *Additives for Plastics,* vol. 1, pp. 123–167.

Hans G. Volz, Gunther Kampf and Hans G. Fitzky, Surface Reactions on Titanium Dioxide Pigments in Paint Films During Weathering, *Process in Organic Coatings,* 2, pp. 223–235 (1973–74).

R. B. McKay, Pigment Dispersion in Apolar Media, *Ciba–Geigy Pigments,* Paisley, Scotland, pp. 361–403.

D. H. Solomon and D. G. Hawthorne, Chemistry of Pigments and Fillers, Krieger Publishing Co., pp. 143–153 (1991).

Film Extrusion Manual—Process, Materials, Properties, editors Thomas I. Butler and Earl W. Veazey, Tappi Press (1992).

Juergen H. Braun, Andrejs Baidins and Robert E. Marganski, TiO2 Pigment Technology: A Review, *Progress in Organic Coatings,* 20, pp. 105–138 (1992).

Union Carbide's Product Information brochure on A–137 (1991).

World Surface Coatings Abstracts, Chemical Surface Treatment of Alumina, Titanium Dioxide and Talc, and Their Surface Nature, *J. Jap. Soc. Col. Mat,* 65, No. 2, 59–67, 1992.

Patent Abstracts of Japan, vol. 8, No. 153, p. 287, (Jul. 17, 1984).

PROCESSIBILITY AND LACING RESISTANCE WHEN SILANIZED PIGMENTS ARE INCORPORATED IN POLYMERS

CROSS-REFERENCE TO RELATED APPLICATIONS

This application is a continuation of application Ser. No. 08/477,754 filed on Jun. 7, 1995, now U.S. Pat. No. 5,631,310 which is a divisional of application Ser. No. 08/203,108 filed Feb. 28, 1994 now U.S. Pat. No. 5,607,994.

BACKGROUND OF THE INVENTION

The present invention relates to white-pigmented polymers (particularly, polyolefins such as polyethylene) containing white pigments treated with an organosilicon compound to improve processibility in compounding and improve performance properties such as lacing resistance in a polyolefin matrix.

Treatment of $TiO_2$ pigment with organosilicon compounds to improve dispersibility in a polymer matrix is well known in the art. For example, U.S. Pat. Nos. 4,061,503 and 4,151,154 disclose enhanced dispersibility of $TiO_2$ in paints and plastics. Therein, the $TiO_2$ is surface treated with a silane possessing at least two hydrolyzable groups bonded to silicon and an organic group containing a polyalkylene oxide group.

In addition, U.S. Pat. 4,810,305 discloses a modified hydrophobic pigment or filler containing 0.05 to 10 weight % of an organopolysiloxane, with improved dispersibility in synthetic resins.

However, deficiencies in the prior art include, but are not limited to, (1) unacceptable processibility, i.e., dispersibility of $TiO_2$ pigment in a polymeric matrix at slow rates; and (2) lacing, i.e., development of imperfections in a polyolefin matrix. Lacing occurs as a result of volatiles released from the pigment during high temperature polyolefin fabrication processes. Lacing may also be attributable to $TiO_2$ concentrates picking up moisture. A further disadvantage is that higher loadings of $TiO_2$ pigment in a polymer concentrate result in slower processing rates.

It has been found that the above combined disadvantages of the prior art can be overcome by the present invention.

SUMMARY OF THE INVENTION

In accordance with this invention there is provided a polymeric matrix comprising polymer and about 0.01 to about 87% by weight silanized $TiO_2$ pigment, based on the weight of the polymeric matrix, wherein the silanized $TiO_2$ pigment has a coating of about 0.1 to about 5% by weight, based on the weight of silanized $TiO_2$ pigment, of an organosilicon compound selected from at least one silane, or a mixture of at least one silane and at least one polysiloxane. It has been found that the silanized pigmentary $TiO_2$ provides a unique combination of enhanced processibility in a polymeric matrix having higher $TiO_2$ loadings, and improved end use performance properties such as lacing resistance in a polyolefin matrix at $TiO_2$ concentrations ranging from about 0.2 to about 20% by weight, based on the weight of the polyolefin matrix.

DETAILED DESCRIPTION

The $TiO_2$ pigments useful in the present invention generally are in the rutile or anatase crystalline form. It is commonly made by either a chloride process or a sulfate process. $TiCl_4$ is oxidized to $TiO_2$ particles in the chloride process. Sulfuric acid and ore containing titanium are dissolved, and the resulting solution goes through a series of steps to yield $TiO_2$, in the sulfate process. Both the sulfate and chloride processes are described in greater detail in "The Pigment Handbook", Vol. 1, 2nd Ed., John Wiley & Sons, N.Y. (1988), the teachings of which are incorporated herein by reference. The optimum average particle size can range from about 0.005 to about 1 micron. The $TiO_2$ pigments may also contain ingredients added thereto to further improve dispersibility characteristics or other properties such as durability. Thus, by way of example, but not limited thereto, the pigment may contain additives and/or inorganic oxides, such as aluminum, silicon or tin as well as triethanolamnine, trimethylolpropane, phosphates, etc. "Silanized" $TiO_2$ is defined herein to refer to $TiO_2$ treated with either at least one silane, or a mixture of at least one silane and at least one polysiloxane (collectively referred to herein as organosilicon compounds).

Suitable silanes have the formula:

$$R_xSi(R')_{4-x}$$

wherein

R is a nonhydrolyzable aliphatic, cycloaliphatic or aromatic group having at least 1 to about 20 carbon atoms;

R' is a hydrolyzable group such as an alkoxy, halogen, acetoxy or hydroxy or mixtures thereof; and x=1 to 3.

For example, silanes useful in carrying out the invention include octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Additional examples of silanes include, R=8–18 carbon atoms; R'=chloro, methoxy, hydroxy or mixtures thereof; and x=1 to 3. Preferred silanes are R=8–18 carbon atoms; R'=ethoxy; and x=1 to 3. The R=8–18 carbon atoms is preferred for enhanced processibility. R'=ethoxy is preferred for ease of handling. Surprisingly, lower chain alkyl silanes resulted in longer processing times. Mixtures of silanes are contemplated equivalents. Weight content of the silane, based on total silanized pigmentary $TiO_2$ is typically about 0.1 to about 5 weight %, preferably about 0.5 to about 1.5 weight %. In excess of 5 weight % may be used but no particular advantage is observed.

In an alternative embodiment, a mixture of at least one silane with at least one polysiloxane is useful in carrying out the invention. Suitable polysiloxanes have the formula:

$$(R_nSiO_{4-n/2})m$$

wherein

R is organic or inorganic groups;

n=0–3; and m≧2.

For example, polydimethylsiloxane (PDMS), vinyl phenylmethyl terminated dimethyl siloxanes, divinylmethyl terminated polydimethyl siloxane and the like are suitable polysiloxanes. PDMS is a preferred polysiloxane. The silane useful in the mixture may be the silane described above with R=1–8 carbon atoms, R'=alkoxy and x=1 preferred. Weight content of the silane and polysiloxane, based on total silanized pigmentary $TiO_2$, is about 0.1 to about 5.0 weight %, preferably from about 1 to 3 weight %. Especially preferred is about 0.5 to 1 weight % silane with R=4 or 8 carbon atoms, R'=alkoxy, and x=1; and 1 weight % PDMS. The ratio of silane to polysiloxane can be 1 silane:2 polysiloxane up to 2 silane: 1 polysiloxane. An especially preferred ratio is 1 silane: 1 polysiloxane.

The silane and polysiloxane are commercially available or can be prepared by processes known in the art such as those described in "Organosilicon Compounds", S. Pawlenko, et al., New York (1980), the teachings of which are incorporated herein by reference. The method of addition is not especially critical and the $TiO_2$ pigment may be treated with the silane in a number of ways. For example, the silane addition can be made neat or prehydrolyzed to a dry pigmentary base, from a slurry, a filtration step, during drying or at a size operation such as a fluid energy mill, e.g., micronizer, or media mill as described in greater detail in copending application entitled "IMPROVED SLURRY PROCESS FOR PREPARING SILANIZED $TiO_2$ PIGMENTS, USING A MEDIA MILL", the teachings of which are incorporated herein by reference, or post blending after micronizing. For example, U.S. Pat. No. 3,834,924 describes organosilane and pigment dispersion mixed or blended directly in a suitable solids mixing apparatus. An example of post blending is described in greater detail in U.S. Pat. Nos. 3,915,735 and 4,141,751. The polysiloxane addition can be made in conjunction with the silane or post addition to the silanized pigment. The silane addition and polysiloxane addition is described in greater detail below. If water, either a liquid or vapor (steam), is present as a component of the process stream, hydrolysis of the hydrolyzable groups of the silane will occur and the silane coating will bond to the $TiO_2$ base. Prehydrolyzing the silane is a preferred step in treating the $TiO_2$ pigment with the silane. If the silane is added neat to the $TiO_2$ base, then moisture adsorbed on the $TiO_2$ will effect the hydrolysis, but at a lower rate than if excess moisture is present. Hydrolysis of silanes is described in greater detail in "Organofunctional Silanes" by Union Carbide (1991), the teachings of which are incorporated herein by reference.

Polymers which are suitable for use in the present invention include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate, etc,; vinyls such as polyvinyl chloride, polyvinyl esters such as polyvinyl acetate, polystyrene, acrylic homopolymers and copolymers; phenolics; alkyds; amino resins; epoxy resins, polyamides, polyurethanes; phenoxy resins, polysulfones; polycarbonates; polyether and chlorinated polyesters; polyethers; acetal resins; polyimides; and polyoxyethylenes. The polymers according to the present invention also include various rubbers and/or elastomers either natural or synthetic polymers based on copolymerization, grafting, or physical blending of various diene monomers with the above-mentioned polymers, all as generally known in the art. Thus generally, the present invention is useful for any such white-pigmented plastic or elastomeric compositions (collectively referred to herein as a white-pigmented polymers). For example, but not by way of limitation, the invention is felt to be particularly useful for polyolefins such as polyethylene, polypropylene, polyvinyl chloride, polyamides and polyesters.

As used herein, "high loaded" $TiO_2$ may vary widely for each polymeric matrix but will be in a well known range for those skilled in the art. For example, in a polyolefin matrix, a high loaded $TiO_2$ would be 50 or above % by weight $TiO_2$ pigment, based on the weight of the polyolefin matrix.

A wide variety of conventional additives may be included in the polymers as is necessary, desirable or conventional for the intended end use. Such additives include, but are not limited to, antioxidants, light stabilizers, lubricants, thermal processing additives and the like.

$TiO_2$ coated with organosilicon compounds can be incorporated into a melt-fabricable polymer to form the polymer composition of this invention by any melt compounding technique known in the art. Generally, $TiO_2$ and polymer resin are brought together and then mixed in a blending operation that applies shear to the polymer melt. The polymer resin is usually available in the form of powder, granules, pellets, or cubes. Commonly, $TiO_2$ and resin are first combined while the resin is in the solid state (not melted) and dry-blended in some way. This can be done in simple ways, such as by shaking in a bag or tumbling in a closed container, or in more sophisticated ways such as by using blenders having agitators or paddles. $TiO_2$ and polymer resin can be brought together by co-feeding the materials to internal mixers and allowing a screw to mix them together before the resin reaches the molten state. The melt blending of $TiO_2$ and polymer resin can be done using known equipment, such as single-screw extruders, twin-screw extruders, internal mixers, and the like. Internal mixers are commonly used. The melt blending can be done as part of the process of forming a finished article of the composition, as by melt extrusion. Alternatively, the melt blending can be done in a preliminary step, optionally isolating the polymer composition, e.g., as cubes, followed by forming a finished article in a subsequent process. As one skilled in the art will recognize, there are many possible variations of the technique for preparing polymer compositions of the invention. One may, for example, first prepare a concentrate having high $TiO_2$ concentration, i.e., one composition of the invention, and then combine the concentrate with polymer resin containing no $TiO_2$ to obtain another composition of the invention.

The highly loaded polymer concentrates are made as described above with the desirable weight % for the intended end use. For example, in polyolefin concentrates, about 50–87% by weight concentrate may be used to opacity. The concentrate is "let down" into the polyolefin. Used herein, "let down" refers to a ratio or percent of resin mixed with concentrate. Let down may be accomplished in a number of ways and is described in great detail in "Film Extrusion Manual" (1992), the teachings of which are incorporated herein by reference. For example, in lacing evaluation, a 50 wt. % to 87 wt. % concentrate may be let down to about 0.2 to about 20 weight % by dry mixing polyolefin and extruding at a specific processing temperature and casting it into a film. Pigment performance is then evaluated in an end use application.

The highly loaded silanized pigmentary $TiO_2$ exhibits outstanding processibility in a polymeric matrix and lacing resistance when incorporated into a polyolefin matrix. Additional advantages observed are increased bulk density, lower viscosity, excellent dispersibility, moisture resistance, and excellent optical properties such as high tint strength.

The following examples are construed as illustrative and not limitative of the remainder of the disclosure in any way whatsoever. Farrel BR Banbury\-type mixers (available from Farrel Corp., Ansonia, Conn., USA) have been used in the Examples. Broad range internal mixers as known in the art are contemplated equivalents. For example, Farrel Continuous Mixers (FCM) (available from Farrel Corp., Ansonia, Conn., USA) and twin screw extruders are equally applicable.

Bulk density is given as grams per cubic centimeter of uncompacted pigment. A pigment bulk density below about 0.6 will result in difficult solids handling in polymer compounding. For rapid compounding of $TiO_2$ and a polymer in a Banbury\-type mixer, a bulk density above about 0.6 is desirable.

Total flux time is a measure of processing time, or time to disperse, in a Banbury\-type mixer.

Viscosity, at 180 degrees Celsius, of product from the Banbury\-type mixer, was measured at a shear rate of 550 1/sec. Viscosity was measured with a Kayeness capillary rheometer (available from Kayeness Corp., Honey Brook, Pa., USA).

EXAMPLES

PREPARATION OF A CONCENTRATE, i.e., MASTERBATCH

In the following examples, a 70 wt. % compound of a dry mix $TiO_2$ balance polyethylene was prepared in the following manner. First, a dry mix of $TiO_2$/balance polyethylene was prepared via blending of 1562 grams of the $TiO_2$ with 670 grams of polyethylene. The polyethylene used for the experiments was a low density polyethylene supplied by Quantum U.S.I. Chemicals—Code=NA212 (Cincinnati, Ohio, USA).

The dry mix of $TiO_2$/polyethylene was added to the feed hopper of a laboratory Farrel BR Banbury\-type Mixer (chamber capacity=about 1100-about 1200 cc). The dry mix was then discharged into the Mixer. Stock pressure equaled 56 psi, driven rotor speed=230 rpm, cooling water=85° F. The Mixer was equipped with recording equipment for batch temperature, power consumption, ram pressure, and heat loss.

The mixture of $TiO_2$/polyethylene was subsequently processed until the $TiO_2$ dispersed into the melted resin (temperature=for example 220° F.) defined above as total flux time. The compound was then discharged from the mixer.

EXAMPLE 1

3000 grams of neutralized pigmentary rutile $TiO_2$ were weighed into a pan and sprayed with 30 grams of butyl trimethoxy silane, as supplied by Union Carbide now Osi Specialty, Inc. (Tarrytown, N.Y., USA).

The treated pigment was ground in a fluid energy mill, e.g., micronizer with superheated steam.

The micronized pigment was mixed in a Patterson-Kelley V-Blender with 30 grams of polydimethylsiloxane, as supplied by Petrach now Huls Corp. (Piscataway, N.J., USA).

The treated $TiO_2$ polyethylene concentrate was prepared as described above.

EXAMPLE 2

Same as Example 1 except that octyl triethoxy silane was used in place of butyl trimethoxy silane.

EXAMPLE 3

Neutralized pigmentary rutile $TiO_2$ was treated with about 1 wt % of each of octyl triethoxy silane and polydimethylsiloxane as for Example 1, except that these compounds were added at the micronizer, through existing nozzles in a grinding chamber. The treated pigment and low density polyethylene were then mixed and processed in a Banbury\-type mixer to form a 70 wt % masterbatch, as described above.

EXAMPLE 4

Neutralized pigmentary rutile $TiO_2$ was treated with about 1 wt % of octyl triethoxy silane, by spraying, as for Example 1. There was no treatment with polydimethylsiloxane. The treated pigment was micronized, and used for processing in a Banbury\-type mixer to a 70 wt % polyethylene masterbatch, as described above.

COMPARATIVE EXAMPLE 5 (C-5)

Pigmentary rutile $TiO_2$ and low density polyethylene were mixed and processed in a Banbury\-type mixer to form a 70 wt % polyethylene masterbatch, as described above.

The results of the tests on the masterbatches from Examples 1–5 are summarized in the table below.

| Example | Bulk Density g/cc) | Total Flux (s) | Viscosity (p) |
|---|---|---|---|
| 1 | 0.96 | 26 | 3675 |
| 2 | 1.01 | 26.2 | 3681 |
| 3 | 0.78 | 24.5 | 3479 |
| 4 | 0.97 | 28.2 | 3927 |
| C-5 | 0.54 | 37.6 | 4459 |

This data demonstrated the processing advantages of organosilicon compound treated pigments (Examples 1–4) versus a non-treated pigment (Example C-5) in a 70 wt. % $TiO_2$/polyethylene masterbatch. Shown in the table are bulk density improvements realized by the organosilicon compound treatments, total flux time improvements, and viscosity improvements for these materials over non-treated.

EXAMPLE 6

Dried, crushed, meshed pigmentary rutile $TiO_2$ filter cake was sprayed with about 1 wt. % of neat octyl triethoxy silane, as supplied by Osi.

The treated pigment was micronized and used for processing in a Banbury\-type mixer to a 70 wt. % polyethylene masterbatch, as described above.

COMPARATIVE EXAMPLE 6A

Same as Example 6 except butyl trimethoxy silane was used in place of octyltriethoxysilane. The results of the tests on the masterbatches from Examples 6–6A are summarized in the table below.

| Example | Bulk Density g/cc) | Total Flux (s) | Viscosity (p) |
|---|---|---|---|
| 6 | 0.97 | 28 | 3927 |
| 6A | 0.77 | 48 | 3921 |

This data demonstrated the differences for a higher chain alkyl silane (Example 6) versus a lower chain alkyl silane. Surprisingly, the lower chain alkyl silanes resulted in longer processing times. The lower chain alkyl silane realized a 70% increase in processing time over the higher chain alkyl silane.

EXAMPLE 7

3000 grams of pigmentary rutile $TiO_2$ was treated with 1 weight % (30 grams) octyltriethoxysilane via spraying.

Material was processed in a Banbury\-type mixer at 70 weight % in a polyethylene masterbatch as described above.

COMPARATIVE EXAMPLE 7A 3000 grams of pigmentary rutile $TiO_2$ was treated with 1 weight % (30 grams) polydimethylsiloxane (PDMS) via spraying. Material was processed in a Banbury\-type mixer at 70 weight % in a polyethylene masterbatch as described above.

EXAMPLE 8

Pigmentary rutile $TiO_2$ was treated with 1 weight % octadecyltriethoxy silane (available from IHuls) via spraying. Material was processed in a Banbury\-type mixer at 70 weight % in a polyethylene masterbatch as described above.

The results of tests on the masterbatches from Examples 7, 7A and 8 are summarized in the table below.

| Example | Bulk Density g/cc) | Total Flux (s) | Viscosity (p) |
|---|---|---|---|
| 7 | 0.63 | 30.2 | 2968 |
| 7A | 0.59 | 35.3 | 3491 |
| 8 | 0.58 | 33 | 2746 |

This data demonstrated a series of post-blended higher chain alkyl silane (Examples 7 and 8) and siloxane (Comparative Example 7A) treated materials. For the two silane treated materials (Examples 7 and 8) treated with a higher chain alkyl silane, final product viscosities were nearly identical. For the siloxane only (Comparative Example 7A) treated material viscosity and processing time were higher.

EXAMPLE 9

Silanized pigment, octyltriethoxysilane, and polyester were dry blended in a double cone blender for 5 minutes to yield a 50/50 mixture. This mixture was added to a feed hopper of a Farrel Continuous Mixer (FCM). The mixture of treated $TiO_2$/polyester was subsequently processed until the treated $TiO_2$ dispersed into the melted resin (temperature= 550° F.). Observable flow of the concentrate was smooth and continuous.

COMPARATIVE EXAMPLE 9A

An untreated anatase pigment, Kronos 1072 (available from Kronos, Leverkuesen, Germany), was dry blended, fed and processed in the FCM as in Example 9. Observable flow of the concentrate was not smooth. Continuous flow was not attained.

LACING

Lacing occurs as a function of pigment volatility at specific wt % pigment loadings and processing temperature. For polyethylene films pigmented with titanium dioxide, 20 wt % $TiO_2$ in the film processed at temperatures of 620° F. or greater will discern readily lacibility of the film. Typically, materials are rated 10 if they do not lace, and below 10 if they begin to lace.

Two materials are compared in the following for lacing.

EXAMPLE 10

By weight, 20% of an octyltriethoxy silane treated $TiO_2$ was compounded into balance polyethylene. Material was extruded on a Killion single screw extruder through a film die at 620° F. Evaluation of the film on a light box revealed superior integrity with no thin spots or pin-holes. Rating of material equaled 10. Lacing resistance was comparable to the industry standard, Ti-Pure\R-101, available from E. I. du Pont de Nemours and Company, Wilmington, Del., USA.

COMPARATIVE EXAMPLE 10A

By weight, 20% of a siloxane treated pigment RCL-69, (available from SCM, Baltimore, Md., USA) was compounded into balance polyethylene. Material was extruded on a Killion single screw extruder through a film die at 620° F. Material exhibited thin spots under a light box. Material was rated as a 7.

Having thus described and exemplified the invention with a certain degree of particularity, it should be appreciated that the following claims are not to be so limited but are to be afforded a scope conmmensurate with the wording of each element of the claim and equivalents thereof.

What is claimed is:

1. A process for silanizing $TiO_2$ pigment and for highly loading the silanized $TiO_2$ pigment in a polymer concentrate, comprising the steps of:

(a) adding a silane compound to a slurry comprising $TiO_2$ pigment and water, the silane compound having the formula:

$$R_xSi(R')_{4-x}$$

wherein,

R is a nonhydrolyzable aliphatic, cycloaliphatic or aromatic group having 8–20 carbon atoms;

R' is a hydrolyzable group selected from alkoxy, halogen, acetoxy or hydroxy or mixtures thereof; and x=1 to 3;

to form silanized $TiO_2$ pigment; and (b) mixing the silanized $TiO_2$ pigment with a polymer resin to form a highly loaded polymer concentrate comprising about 50 to about 87% by weight silanized $TiO_2$ pigment.

2. A process for silanizing $TiO_2$ pigment and for highly loading the silanized $TiO_2$ pigment in a polymer concentrate, comprising the steps of:

(a) silanizing $TiO_2$ pigment in a slurry comprising $TiO_2$ pigment and water by treating $TiO_2$ pigment with a mixture of a silane compound and a polysiloxane compound, the silane compound having the formula:

$$R_xSi(R')_{4-x}$$

wherein,

R is a nonhydrolyzable aliphatic, cycloaliphatic or aromatic group having 1–20 carbon atoms;

R' is a hydrolyzable group selected from alkoxy, halogen, acetoxy or hydroxy or mixtures thereof; and x=1 to 3;

and (b) mixing the silanized $TiO_2$ pigment with a polymer resin to form a highly loaded polymer concentrate comprising about 50 to about 87% by weight silanized $TiO_2$ pigment.

3. The process of claim 2, wherein the polysiloxane compound has the formula:

$(R_nSiO_{4-n/2})_m$ wherein,

R is an organic or inorganic group;

n=0–3; and m≧2.

4. The process of claim 1 or 2, wherein the highly loaded polymer concentrate comprises about 70 to about 87% by weight silanized TiO$_2$ pigment.

5. The process of claim 4, wherein the polymer resin is polyethylene.

6. The process of claim 1 or 2, wherein the silane compound is octyltriethoxysilane.

7. The process of claim 1 or 2, wherein the silane compound is octyltrichlorosilane.

8. The process of claim 1 or 2, wherein R is an aliphatic having 8–18 carbons, R' is methoxy, ethoxy, chloro, hydroxy, or mixtures thereof, and x=1 to 3.

9. The process of claim 8, wherein R is an aliphatic having 8 carbons, R' is ethoxy, hydroxy, or mixtures thereof, and x=1 to 3.

10. The process of claim 8, wherein R is an aliphatic having 8 carbons, R' is chloro, hydroxy, or mixtures thereof, and x=1 to 3.

11. The process of claim 2, wherein R is an aliphatic having 1–8 carbons, R' is methoxy, ethoxy, chloro, hydroxy, or mixtures thereof, and x=1 to 3.

12. The process of claim 11, wherein R is an aliphatic having 1–8 carbons, R' is ethoxy, hydroxy, or mixtures thereof, and x=1 to 3.

13. The process of claim 11, wherein R is an aliphatic having 1–8 carbons, R' is chloro, hydroxy, or mixtures thereof, and x=1 to 3.

14. The process of claim 13, wherein R is an aliphatic having 6–8 carbons, R' is chloro, hydroxy, or mixtures thereof, and x=1 to 3.

15. The process of claim 2 or 3, wherein the polysiloxane is selected from the group consisting of polydimethylsiloxane, vinyl phenylmethyl terminated dimethyl siloxane, divinylmethyl terminated polydimethyl siloxane, and mixtures thereof.

16. The process of claim 1 or 2, wherein the polymer resin is selected from the group consisting of polyolefins, polyesters, polyvinyl chlorides and polystyrenes.

17. The process of claim 16, wherein the polyolefin is selected from the group consisting of polyethylene, polypropylene, and polybutylene.

18. The process of claim 17, wherein the polyolefin is polyethylene.

19. The process of claim 1 or 2, wherein the TiO$_2$ pigment is silanized with about 0.1 to about 5.0% by weight of the silane compound based on the weight of silanized TiO$_2$ pigment.

20. A process for silanizing TiO$_2$ pigment and for highly loading the silanized TiO$_2$ pigment in a polymer concentrate, comprising the steps of:

(a) treating TiO$_2$ pigment with a silane compound having the formula:

$R_xSi(R')_{4-x}$ wherein,

R is a nonhydrolyzable aliphatic, cycloaliphatic or aromatic group having 8–20 carbon atoms;

R' is a hydrolyzable group selected from alkoxy, halogen, acetoxy or hydroxy or mixtures thereof; and x=1 to 3 to form silanized TiO$_2$ pigment; and (b) mixing the silanized TiO$_2$ pigment with a polymer resin to form a highly loaded polymer concentrate comprising about 50 to about 87% by weight silanized TiO$_2$ pigment.

21. A process for silanizing TiO$_2$ pigment and for highly loading the silanized TiO$_2$ pigment in a polymer concentrate, comprising the steps of:

(a) drying TiO$_2$ pigment and adding to the pigment during drying a silane compound having the formula:

$R_xSi(R')_{4-x}$ wherein,

R is a nonhydrolyzable aliphatic, cycloaliphatic or aromatic group having 8–20 carbon atoms;

R' is a hydrolyzable group selected from alkoxy, halogen, acetoxy or hydroxy or mixtures thereof; and x=1 to 3;

to form silanized TiO$_2$ pigment; and (b) mixing the silanized TiO$_2$ pigment with a polymer resin to form a highly loaded polymer concentrate comprising about 50 to about 87% by weight silanized TiO$_2$ pigment.

22. A process for silanizing TiO$_2$ pigment and for highly loading the silanized TiO$_2$ pigment in a polymer concentrate, comprising the steps of:

(a) mixing a silane compound with water, the silane compound having the formula:

$R_xSi(R')_{4-x}$ wherein,

R is a nonhydrolyzable aliphatic, cycloaliphatic or aromatic group having 8–20 carbon atoms;

R' is a hydrolyzable group selected from alkoxy, halogen, acetoxy or hydroxy or mixtures thereof; and x=1 to 3;

(b) treating TiO$_2$ pigment with one or more compounds resulting from mixing the silane compound and water in step (a) to form silanized TiO$_2$ pigment; and (c) mixing the silanized TiO$_2$ pigment with a polymer resin to form a highly loaded polymer concentrate comprising about 50 to about 87% by weight silanized TiO$_2$ pigment.

23. A process for silanizing TiO$_2$ pigment and for highly loading the silanized TiO$_2$ pigment in a polymer concentrate, comprising the steps of:

(a) treating TiO$_2$ pigment with the reaction products or water and a silane compound having the formula:

$R_xSi(R')_{4-x}$ wherein,

R is a nonhydrolyzable aliphatic, cycloaliphatic or aromatic group having 8–20 carbon atoms;

R' is a hydrolyzable group selected from alkoxy, halogen, acetoxy or hydroxy or mixtures thereof; and x=1 to 3 to form silanized TiO$_2$ pigment; and (b) mixing the silanized TiO$_2$ pigment with a polymer resin to form a highly loaded polymer concentrate comprising about 50 to about 87% by weight silanized TiO$_2$ pigment.

* * * * *

UNITED STATES PATENT AND TRADEMARK OFFICE
CERTIFICATE OF CORRECTION

PATENT NO. : 5,889,090
DATED : March 30, 1999
INVENTOR(S) : Patricia Ann Tooley, Dwight Alan Holtzen, Joseph Anthony Musiano It is certified that error appears in the above-identified patent and that said Letters Patent is hereby corrected as shown below:

At column 10, claim 23, lines 49-50 should read -- (a) treating $TiO_2$ pigment with the reaction products of water and a silane compound having the formula: --.

Signed and Sealed this

Twenty-first Day of September, 1999

*Attest:*

Q. TODD DICKINSON

*Attesting Officer*     *Acting Commissioner of Patents and Trademarks*